United States Patent [19]
Cramer

[11] Patent Number: 6,005,214
[45] Date of Patent: Dec. 21, 1999

[54] METHOD OF MAKING WEAR RESISTANT MATERIAL LINED HOUSINGS

[76] Inventor: Margaret D. Cramer, 9807 Running Cedar La., Indian Trail, N.C. 28079-7706

[21] Appl. No.: 08/976,925

[22] Filed: Nov. 24, 1997

Related U.S. Application Data

[63] Continuation-in-part of application No. 08/673,165, Jun. 26, 1996, abandoned.

[51] Int. Cl.[6] .................................. B23H 9/00; B23H 7/02
[52] U.S. Cl. ....................................... 219/69.17; 219/69.12
[58] Field of Search .............................. 219/69.12, 69.17; 29/888.3, 889.1

[56] References Cited

U.S. PATENT DOCUMENTS

| | | |
|---|---|---|
| 3,289,649 | 12/1966 | Lamm . |
| 3,878,880 | 4/1975 | Jones . |
| 3,942,917 | 3/1976 | Wieland . |
| 4,017,223 | 4/1977 | Blackwell . |
| 4,028,027 | 6/1977 | Worz . |
| 4,311,445 | 1/1982 | Eley et al. . |
| 4,364,664 | 12/1982 | Theysohn . |
| 4,580,793 | 4/1986 | Bronson ................................. 29/888.3 |
| 4,758,139 | 7/1988 | Yagii . |
| 4,846,122 | 7/1989 | Kristof et al. . |
| 5,149,257 | 9/1992 | Iio . |
| 5,269,057 | 12/1993 | Mendham ............................... 29/889.1 |
| 5,314,321 | 5/1994 | Yamamoto et al. . |
| 5,700,384 | 12/1997 | Marchand et al. .................... 219/69.17 |

FOREIGN PATENT DOCUMENTS

| | | |
|---|---|---|
| 4016841 | 11/1991 | Germany . |
| 62-129587 | 6/1987 | Japan . |
| 4-353283 | 12/1992 | Japan . |

*Primary Examiner*—Geoffrey S. Evans
*Attorney, Agent, or Firm*—Cummings & Lockwood

[57] ABSTRACT

A method of manufacturing a two piece metal housing having wear resistant interior surfaces is disclosed. The method includes the steps of: machining, by wire electrical discharge machining, a slightly oversized shape into an assembled two piece, split metal housing; disassembling the two piece, split metal housing; applying a hard material to the inner surfaces of the machined area of each of the two pieces with a hard material; after completion of the material applying step, reassembling the two pieces of the split metal housing; and machining the interior surfaces of the surfaces of the area where the hard material was applied to the reassembled metal housing by wire electrical discharge machining to predetermined dimensions. The wear resistant material is preferably a ceramic material, tungsten carbide, or a high velocity oxy-fuel (HVOF) applied hard-coating or other conventional material usable in the specific application.

13 Claims, 10 Drawing Sheets

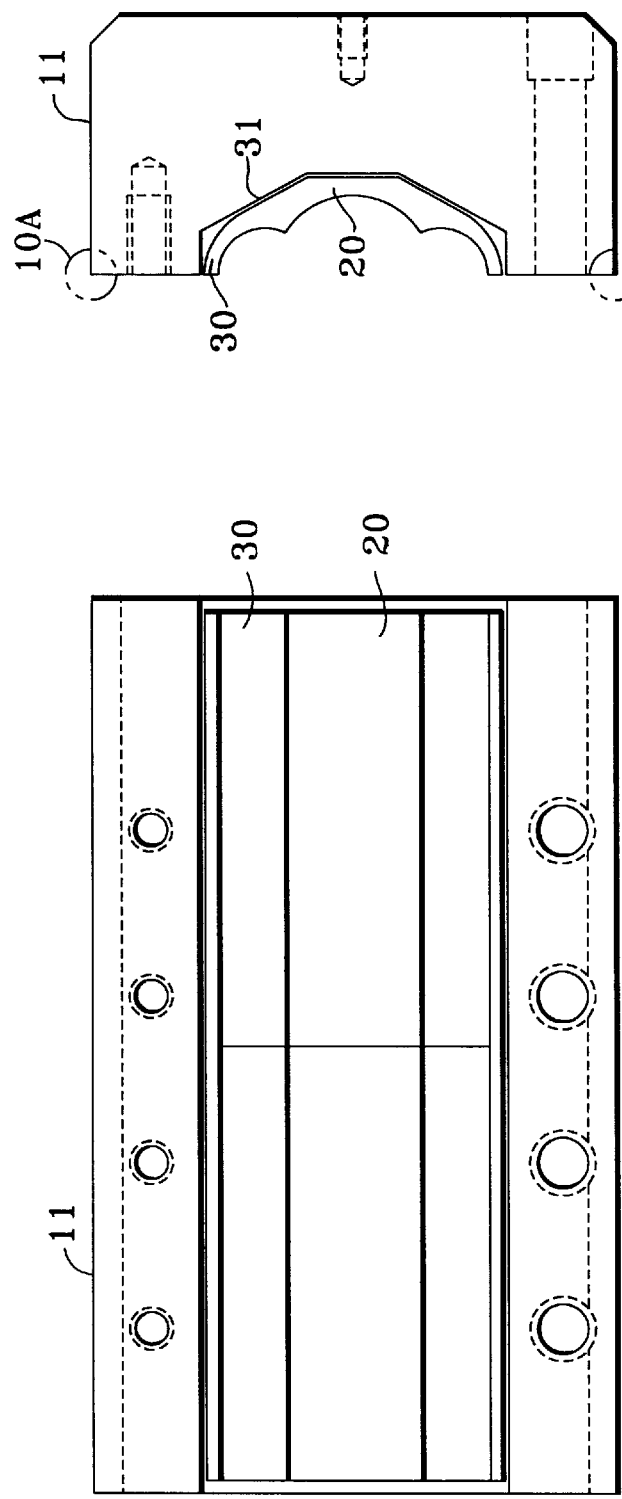

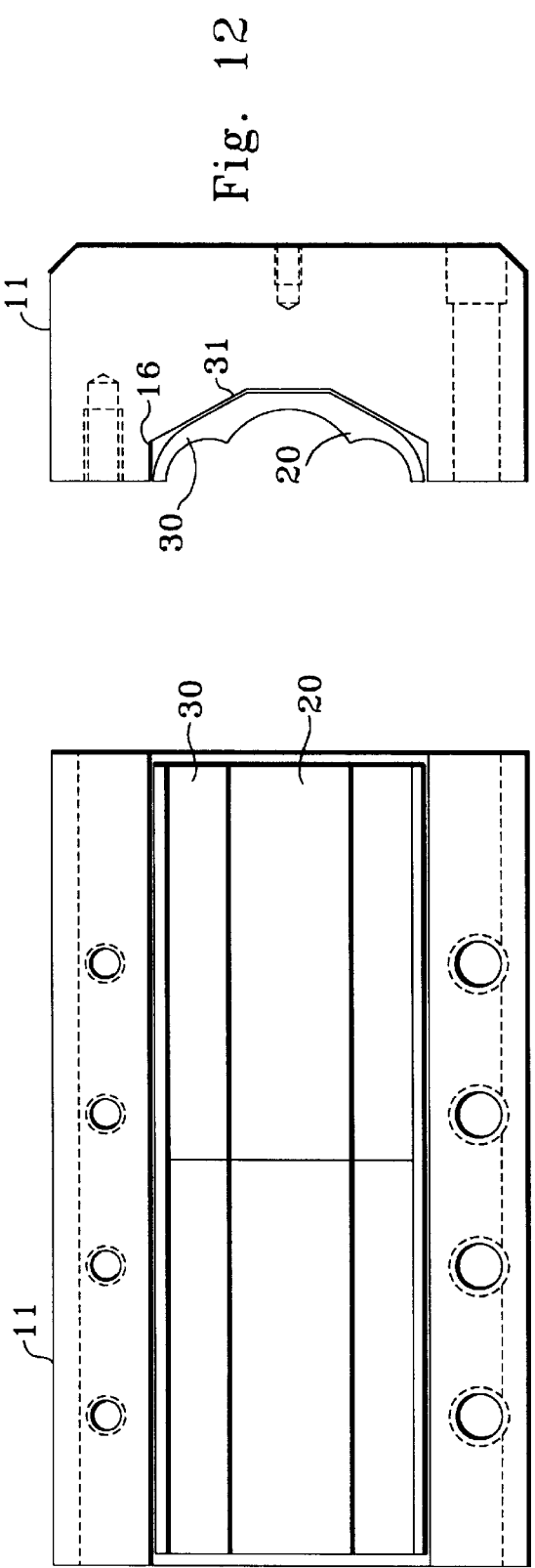

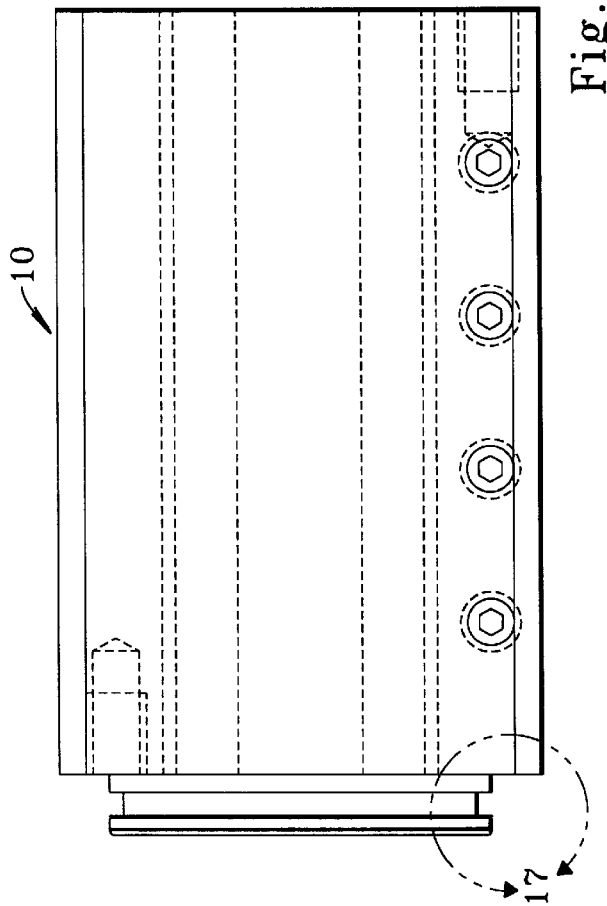
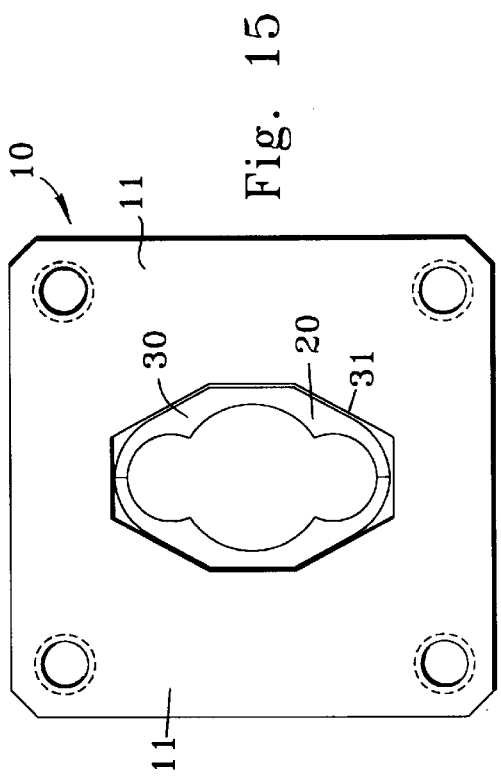
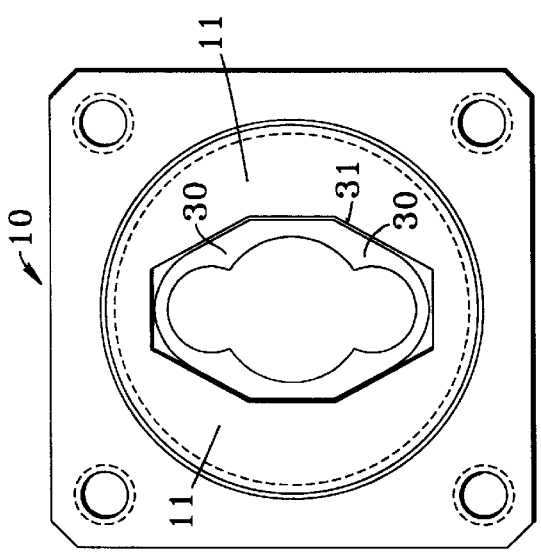
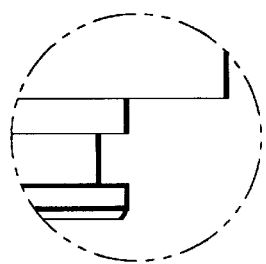

METHOD OF MAKING WEAR RESISTANT MATERIAL LINED HOUSINGS

RELATED APPLICATIONS

This application is a continuation-in-part of U.S. patent application Ser. No. 08/673,165, filed Jun. 26, 1996, now abandoned, the disclosure of which is herein incorporated by reference.

BACKGROUND OF THE INVENTION

The present invention relates generally to pumps and, more particularly, to wear resistant housings for industrial screw pumps used in abrasive environments and method of manufacturing the housings.

In a conventional rotary axial-screw pump, pressure is developed from the inlet or suction port to the outlet or discharge port of the pump in near-even stage-to-stage increments. The stages are defined in accordance with the number of moving-thread closures or isolated volumes formed by meshing of the pump rotors in close tolerance with the pump walls between inlet and outlet ends of the pump.

At a given size and flow rate, pump pressure is developed along the moving thread closures as liquid progresses through the pump. The number of closures is usually proportioned to the desired level of delivered outlet pressure, i.e., the greater the pressure, the greater the number of closures necessary. These closures result in the pump developing an internal gradient of progressively stepped pressure increments. Properly applied, a rotary axial-screw pump will pump a wide range of liquids, from a high-viscosity oil to a light water-soluble oil in solution.

In practice, rotary axial-screw pumps are often used to pump contaminated or recirculated fluids which contain fine metal, grit, sand and/or other abrasives. The ductile, machinable metals typically used internally in these pumps and under these conditions, however, often experience considerable wear.

Conventional solutions to this problem have been limited. For example, to maintain screw pump efficiency, the design of pump rotor housings dictates that tri-bore areas, i.e., the bored areas of the rotor housings where the rotors are located, have very smooth finishes and be made to close tolerance with the rotors. The need for a close tolerance has also precluded designers from opening-up pump clearances to allow for the free passage of contaminated fluid.

Use of conventional sprayed hard coatings have also been found unsuitable. This is due, at least in part, to the difficulty in applying them evenly, as most hard coating spray nozzles do not fit easily into conventional small tri-bore diameters. Cast or dipped hard coatings have also been difficult to apply evenly since tri-bore diameters are relatively small as compared to their length. Paint-on coatings, on the other hand, often cannot withstand the pressure and velocity associated with occasional contact between the rotors and housing, causing them to crack and peel during pump operation.

While solid ceramic rotor housings have been considered relatively effective, the expense of the necessary materials combined with the time and difficulty of their production has made them less attractive.

Another prior method of manufacturing wear resistant screw pump housing is disclosed in German Offenlegungsschrift Patent, DE4016841A1 laid open to public inspection on Nov. 28, 1991. In this German patent, in order to avoid the difficulties which occur in the previous methods of manufacture by means of boring and broaching overlapping bores and conditioning of the housing during the manufacture, the screw pump housing was centrally divided in order to enable the internal housing surface to be operated on by external means such as profile milling or profile grinding.

While dividing the housing into two symmetrical components solves some of the problems associated with the expense and difficulty of providing wear resistant material on the internal surfaces of the housing, some problems remained unsolved regarding the symmetry of the bore when the two components were reassembled into the housing.

Thus, there is a need for improved methods of manufacturing wear resistant housings for industrial screw pumps used in abrasive environments that are economical to manufacture, and which results in the closer tolerances of the opposing internal surfaces of the housing.

SUMMARY OF THE INVENTION

It is therefore an object of the present invention to provide an improved method for manufacturing pump housings for use in abrasive fluid environments.

Another object of the present invention is to provide a housing for a screw pump for use in contaminated fluid environments which is simple and inexpensive to produce.

A further object of the present invention is to provide a practical, economical and efficient screw pump housing for use in contaminated fluid environments.

Still another object of the present invention is to increase the useful life of screw pump housings used to transport abrasive fluids.

Yet another object of the present invention is to provide a commercially viable screw pump housing which is both durable and reliable.

One aspect of the present invention includes, a screw pump comprising: a screw pump rotor housing manufactured by a process comprising the steps of: machining, by wire electrical discharge machining, a slightly oversized tri-bore shape into an assembled two piece, split metal housing; disassembling the two piece, split housing into two pieces; applying a wear resistant material to the inner surfaces of the machined area of each of the two pieces; after completion of the wear resistant material applying step, reassembling the two halves of the split housing; and finishing the interior surfaces of the tri-bore area of the two assembled pieces by wire electrical discharge machining to the finished tri-bore dimensions; hardened rotors, operatively positioned in the housing; carbide coated balance pistons and balance piston housings operatively positioned in the housing; and a carbide thrust arrangement on idler rotors of the housing, including a carbide thrust plate and a carbide coated idler thrust bearing operatively positioned in the housing.

Yet another aspect of the present invention includes, a screw pump rotor housing manufactured by a process comprising the steps of: machining, by wire electrical discharge machining, a slightly oversized tri-bore shape into an assembled two piece, split metal housing; disassembling the two piece, split housing into two pieces; applying a wear resistant material to the inner surfaces of the machined area of each of the two pieces; after completion of the wear resistant material applying step, reassembling the two halves of the split housing; and finishing the interior surfaces of the tri-bore area of the two assembled pieces by wire electrical discharge machining to the finished tri-bore dimensions.

Another aspect of the present invention includes a method for manufacturing a two piece metal housing having wear resistant interior surfaces, the method comprising the steps of: machining, by wire electrical discharge machining, a slightly oversized shape into an assembled two piece, split metal housing; disassembling the two piece, split metal housing; coating the inner surfaces of the machined area of each of the two pieces with a hard material; after completion of the coating step, reassembling the two pieces of the split metal housing; and machining the interior surfaces of the coated area the reassembled metal housing by wire electrical discharge machining to predetermined dimensions.

Wear compatibility between the improved rotor housing and other pump components is achieved by use of a complementary design and material system. The system incorporates features of rotor material enhancements, a carbide coated balance piston and balance piston housing, and an enhanced thrust arrangement including a carbide thrust plate and a carbide coated idler thrust bearing.

Other objectives and advantages of the present application will become apparent from the following description, the accompanying drawings and the appended claims.

BRIEF DESCRIPTION OF THE DRAWINGS

FIG. 8 is a plan view of a wear resistant material lined housing sub-assembly for a screw pump, in accordance with a further aspect of the present invention;

FIG. 9 is a side view of the sub-assembly shown in FIG. 8;

FIGS. 10a and 10b are enlarged views of edge configurations of the sub-assembly in FIG. 8;

FIG. 11 is a plan view of a wear resistant material lined housing sub-assembly for a screw pump, in accordance with still another aspect of the present invention;

FIG. 12 is a side view of the sub-assembly shown in FIG. 11;

FIG. 13 is a side view of an assembled wear resistant material lined housing or housing assembly for a screw pump, in accordance with one aspect of the present invention;

FIG. 14 is a plan view of a wear resistant material lined housing assembly for a screw pump, in accordance with another aspect of the present invention;

FIG. 15 is a side view of the assembly shown in FIG. 14;

FIG. 16 is an opposing side view of the assembly in FIG. 14;

FIG. 17 is an enlarged view of an edge of the assembly, as set forth in FIG. 14;

DETAILED DESCRIPTION OF THE INVENTION

Figure 2:
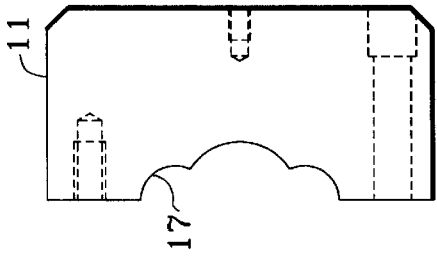
FIG. 2 is a side view of the housing shown in FIG. 1.

Referring now to the drawings and more particularly to FIGS. 1–37, there is provided generally a housing assembly (or assembled housing) 10 (see FIG. 13) lined with a wear resistant material 20, according to various aspects of the present invention. In one embodiment, the housing 10 is constructed of a wear resistant insert 30 (see FIGS. 6 and 7) adhered to a split-housing or housing sub-assembly 11 (see FIGS. 1–4), e.g., of a relatively low carbon steel. Wear resistant materials contemplated include, but are not limited to, a high velocity oxy-fuel (HVOF) applied hard-coating or a ceramic material such as, for example, tungsten carbide, or the like suitable for use as the wear resistant material in a particular application.

Wear compatibility between the improved rotor housing and other pump components is achieved by use of a complementary design and material system. Generally speaking, the system incorporates features of rotor material enhancements, a carbide coated balance piston 12 (see FIGS. 18–20) and balance piston housing (or bushing) 13 (see FIGS. 21–23), and an enhanced thrust arrangement including a carbide thrust plate 14 (see FIGS. 27–28) and a carbide coated idler thrust bearing or enhanced idler thrust bearing (or rotor) 15 (see FIGS. 29–31).

In the present invention, the axial balancing of the rotors is achieved through use of a hydrostatic thrust arrangement.

The idler thrust bearing comprises the end of each idler rotor 15 and the thrust plate 14. The performance is enhanced by using carbide coating on the bearing end of the idler rotor and by using a carbide thrust plate. The use of the carbide enhancements extends the useful life of the idler rotor and the thrust plate when used in a high wear (particle contaminated) application. Unless the above described components are enhanced, they would fail long before the new split housing design and would render the advantage of the longer useful operational life achieved thereby less valuable.

Figure 1:
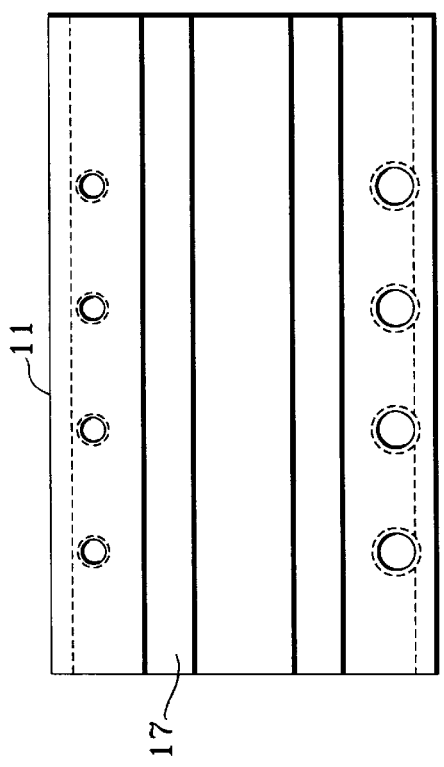
FIG. 1 is a plan view of a wear resistant material lined housing sub-assembly for a screw pump, in accordance with one aspect of the present invention.

According to one aspect of the present invention, as shown in FIGS. 1–2, the split-housing 11 is formed of metal and machined initially with a selected, slightly oversized tri-bore shape. The area of the shape is then sprayed (or welded) with a wear resistant coating or overlay 17, such as, for example, tungsten carbide or stellite. The thickness of the coating (or insert) is such that the tri-bore shape assumes an undersized condition. Alternatively or concurrently therewith, a high velocity oxy-fuel (HVOF) applied hard-coating may be used, within the spirit and scope of the present invention. In another alternative embodiment, a PVD or CVD coating is used.

Figure 4:
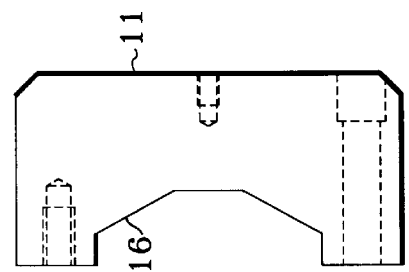
FIG. 4 is a side view of the sub-assembly in FIG. 3.
Figure 3:
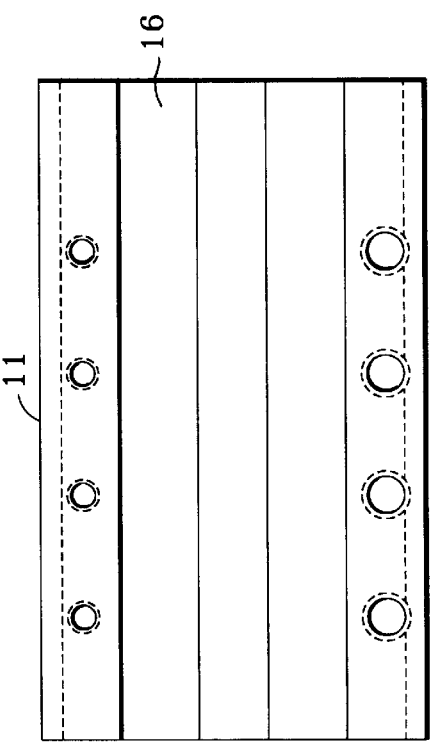
FIG. 3 is a plan view of a wear resistant material lined housing sub-assembly, in accordance with another aspect of the present invention.
Figure 5:
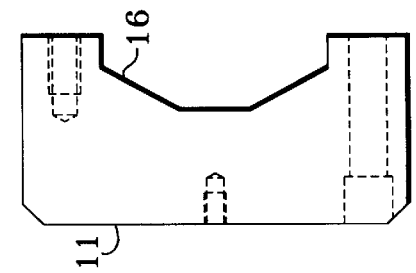
FIG. 5 is an opposing side view of the sub-assembly shown in FIG. 3.
Figure 7:
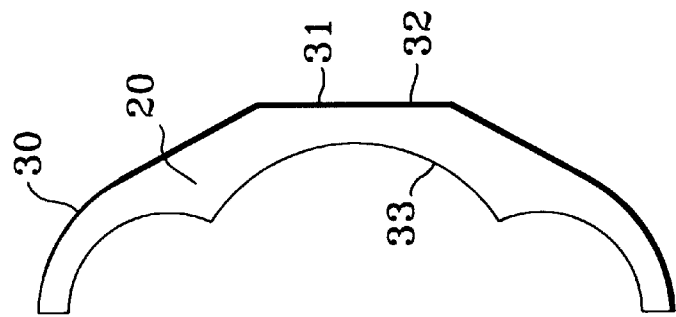
FIG. 7 is a side view of the insert shown in FIG. 6.
Figure 6:
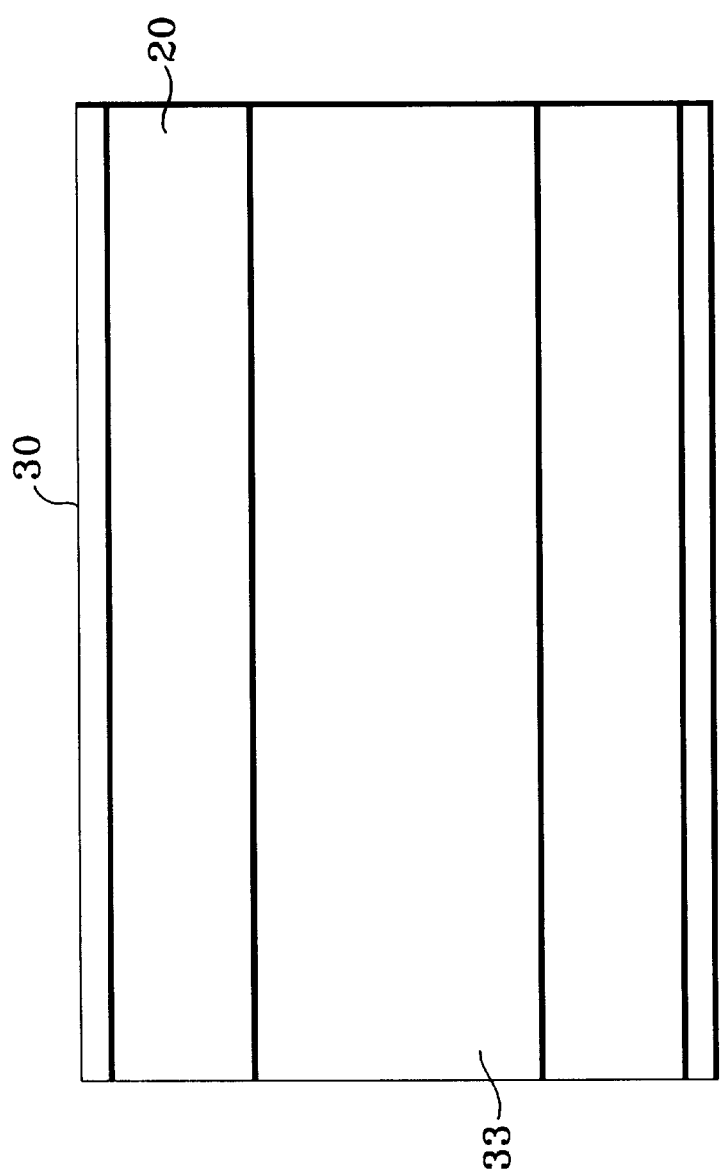
FIG. 6 is a plan view of a housing insert of a wear resistant material, in accordance with one aspect of the present invention.
Figure 19:
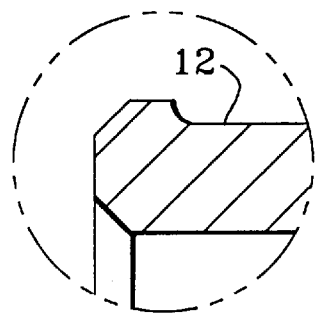
FIG. 19 is an enlarged view of an edge configuration of the piston in FIG. 18.
Figure 18:
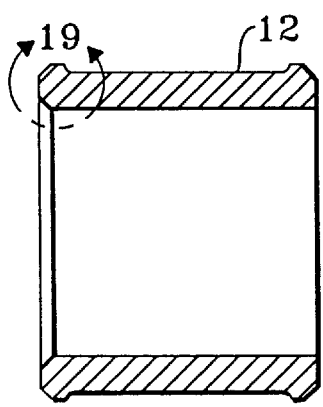
FIG. 18 is a sectional view of a semifinished, uncoated balance piston, according to one embodiment of the present invention.
Figure 20:
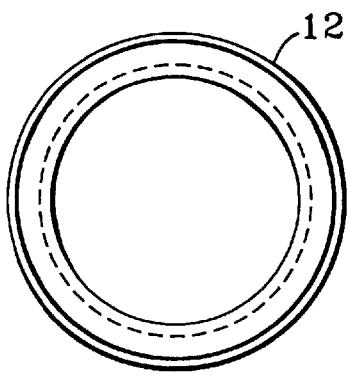
FIG. 20 is an end view of the piston shown in FIG. 18.
Figure 22:
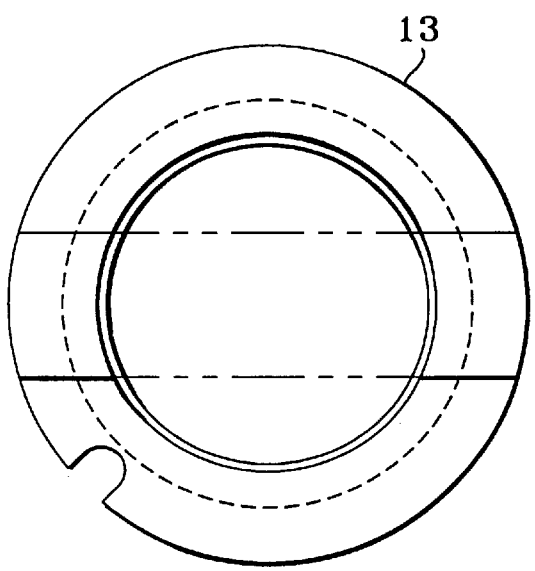
FIG. 22 is an end view of the bushing shown in FIG. 21.
Figure 21:
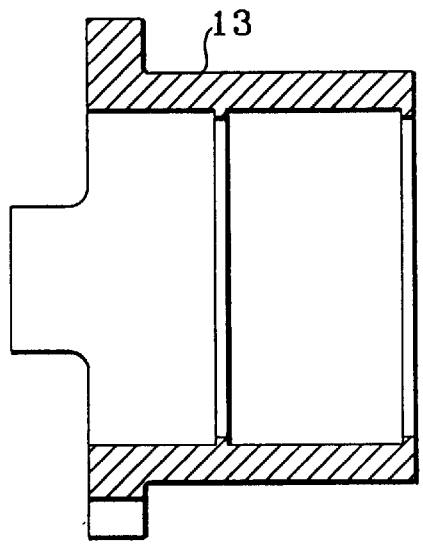
FIG. 21 is a sectional view of a finished balance piston bushing, according to one embodiment of the present invention.
Figure 23:
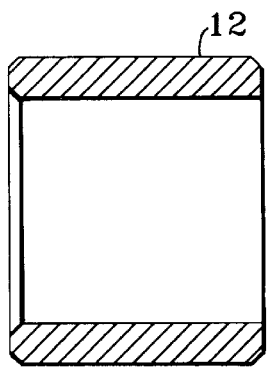
FIG. 23 is a sectional view of a finished balance piston having a carbide coating on its outer diameter, according to another embodiment of the present invention.
Figure 24:
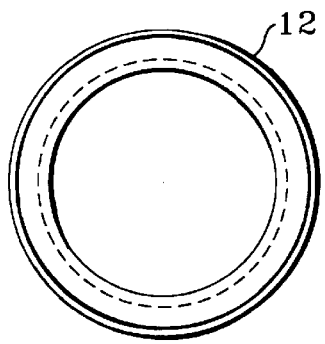
FIG. 24 is an end view of the piston shown in FIG. 23.
Figure 26:
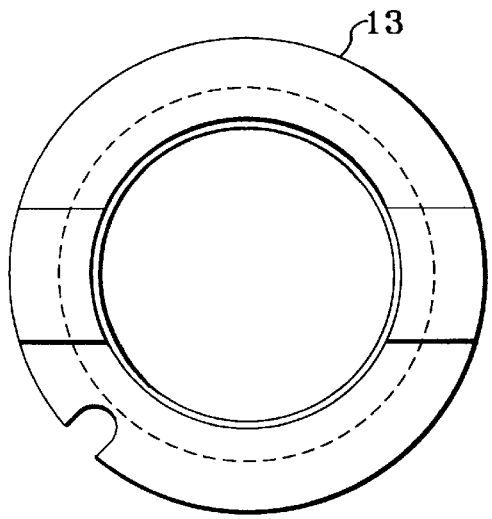
FIG. 26 is an end view of the bushing shown in FIG. 25.
Figure 25:
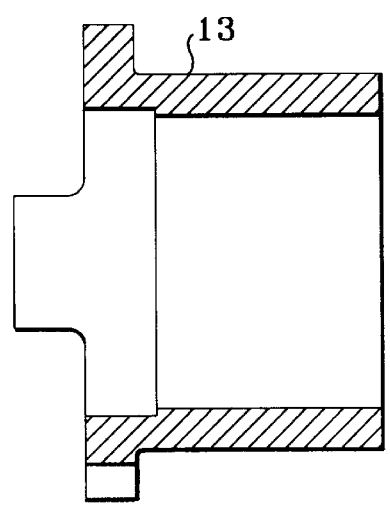
FIG. 25 is a sectional view of a finished balance piston bushing having a carbide coating on its inner diameter, according to another embodiment of the present invention.
Figure 27:
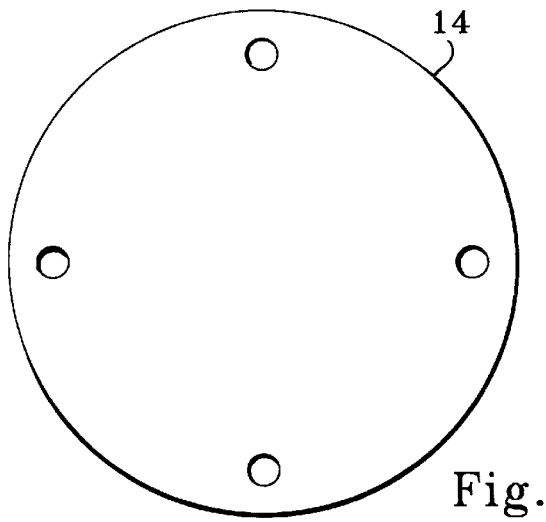
FIG. 27 is a plan view of a thrust plate, in accordance with one aspect of the present invention.
Figure 28:
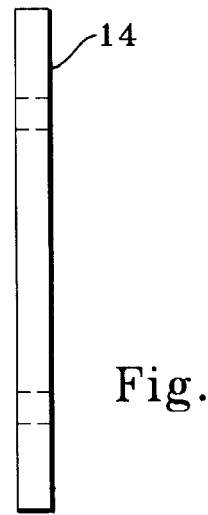
FIG. 28 is a side view of the thrust plate shown in FIG. 27.
Figure 29:
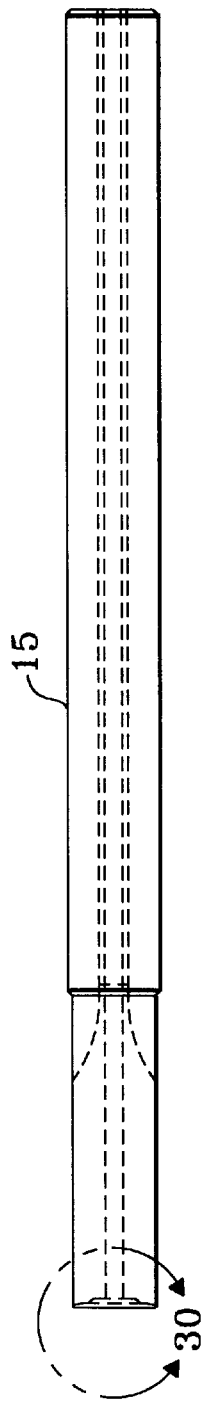
FIG. 29 is a plan view of an idler rotor, according to one embodiment of the present invention.
Figure 31:
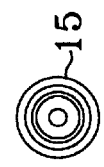
FIG. 31 is an end view of the rotor shown in FIG. 29.
Figure 30:
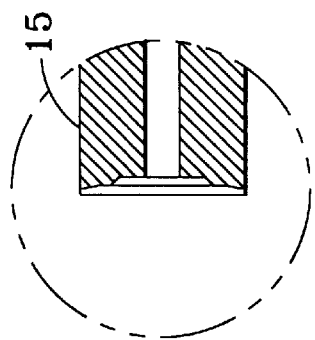
FIG. 30 is an enlarged sectional view of the rotor end of FIG. 30 illustrating the carbide coated bearing surface.

According to a further aspect of the present invention, as shown in FIGS. 3–5, split-housing 11 is machined with a formed slot 16 for receiving an as-molded wear resistant material 20. Specifically, an insert 30, as illustrated in FIGS. 6–7, is made of such wear resistant material and molded with a complementary form 31 on one face 32 and a slightly undersized tri-bore shape 33 on the opposite side. The complementary form of the wear resistant insert is then fixedly mounted to formed slot 16 of the metal housing, using a suitable adhesive, e.g., a 2 part joint face epoxy resin or the like, as best seen in FIGS. 8–12. Upon joining one split-housing to another, housing assembly 10 is formed, as set forth generally in FIGS. 13–16.

According to a further aspect of the present invention, the metal housing selected is one having a conventional outside diameter. The housing is machined so as to accommodate a glued-in molded wear resistant insert or a liner cast in place. Alternatively or concurrently therewith, it is preferred that a high velocity oxy-fuel (HVOF) applied hard-coating be applied to the inside diameter of the insert, in accordance with the present embodiment.

Thereafter, the bores of housing assembly 10 are finished machined by conventional wire EDM machines. In the case of split housing assemblies, the tri-bore sides of two of the housing assemblies are bonded on a mandrel using a thermal cycling resistant adhesive, e.g., cyanoacrylate or the like, and bolted together to form a single complete rotor housing.

Although the present invention is shown and described using a high velocity oxy-fuel (HVOF) applied hard-coating or a ceramic material such as, for example, tungsten carbide, or the like, it is understood that other materials having wear resistant characteristics may be utilized, without departing from the spirit and scope of the present invention as long as they can be finished with the two piece housing assembled into a unit and then machined by using wire Electric-discharge machining (EDM).

Again, it has been discovered that wear is inhibited further by the use of a wear resistant material lined rotor housing assembly, in combination with other features. For example, wear compatibility between the rotor housing and other pump components is further achieved through integration of the carbide coated balance piston, piston housing, carbide thrust plate, and hardened idler rotors with carbide thrust bearing arrangements. These features, which are generally set forth in FIGS. 18–31, together with the above material enhancements and hardening processes to the rotors form a complementary design and material system of the present invention.

Materials contemplated include, but are not limited to, tungsten carbide for the thrust plate 14, a relatively low carbon steel base metal for the balance piston and piston bushing 13, and tool steel for the idler rotor 15.

Where the rotor housing is lined with ceramic, as illustrated in FIGS. 32 and 35–37, it has been found that increased hardness and durability of the ceramic lined housing leads to disproportionately greater wear of other pump components when pumping a fluid containing abrasives. Accordingly, materials for these components must be selected appropriately to maintain pump performance.

Figure 32:
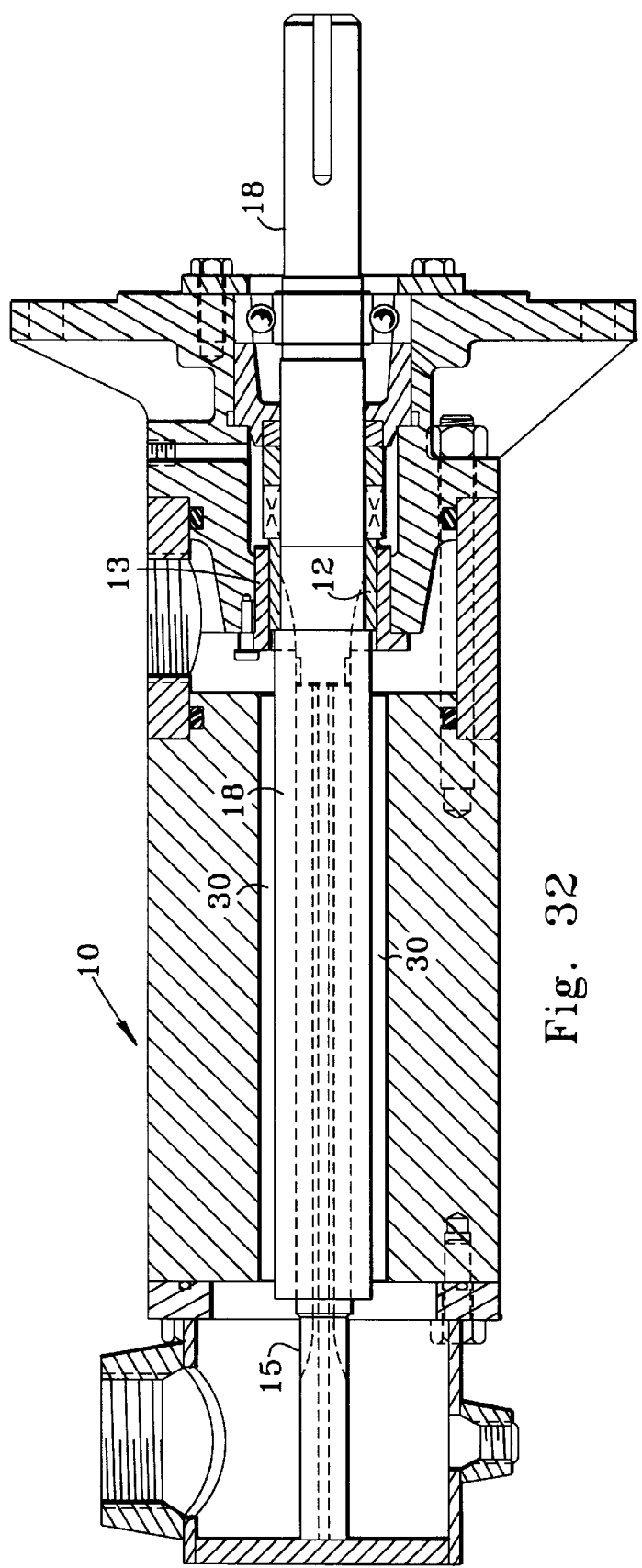
FIG. 32 is a sectional view of a screw pump having a wear resistant material lined housing assembly, in accordance with a further aspect of the present invention.
Figure 33:
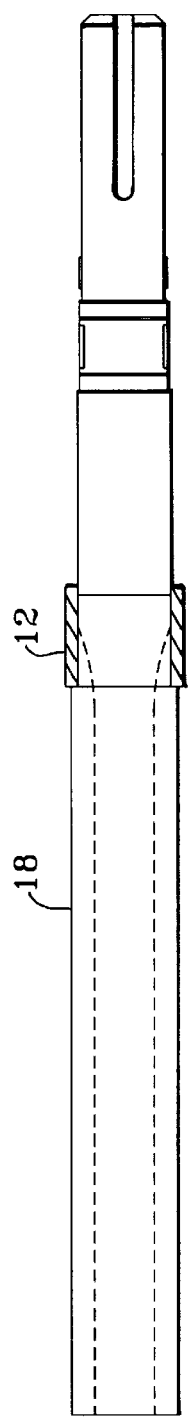
FIG. 33 is a side view of the power rotor of FIG. 32.
Figure 34:
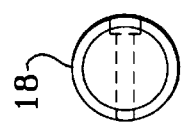
FIG. 34 is an end view of the rotor shown in FIG. 32.
Figure 37:
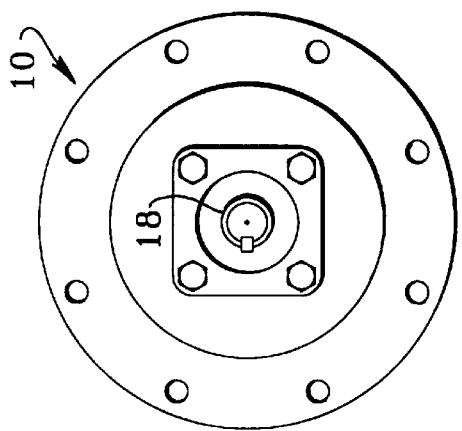
FIG. 37 is an end view of the assembly shown in FIG. 35.
Figure 35:
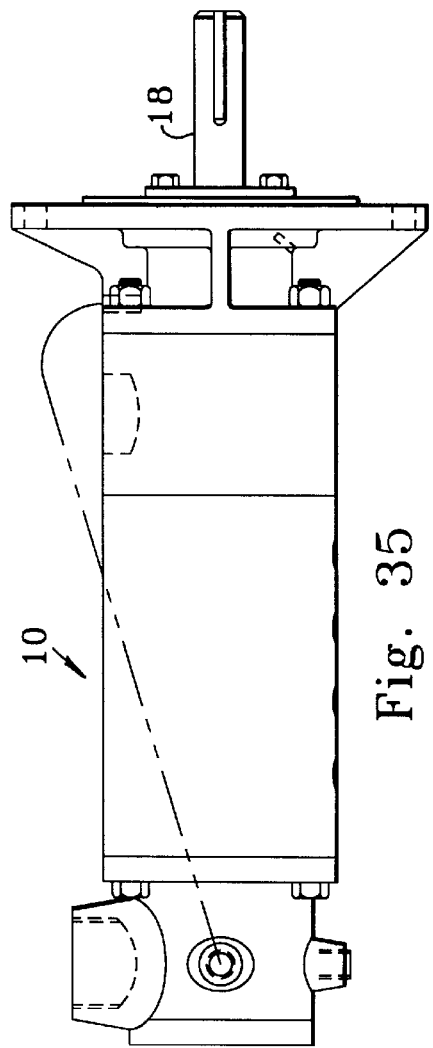
FIG. 35 is an outline side view of a wear resistant material lined housing assembly for a screw pump, in accordance with the present invention.
Figure 36:
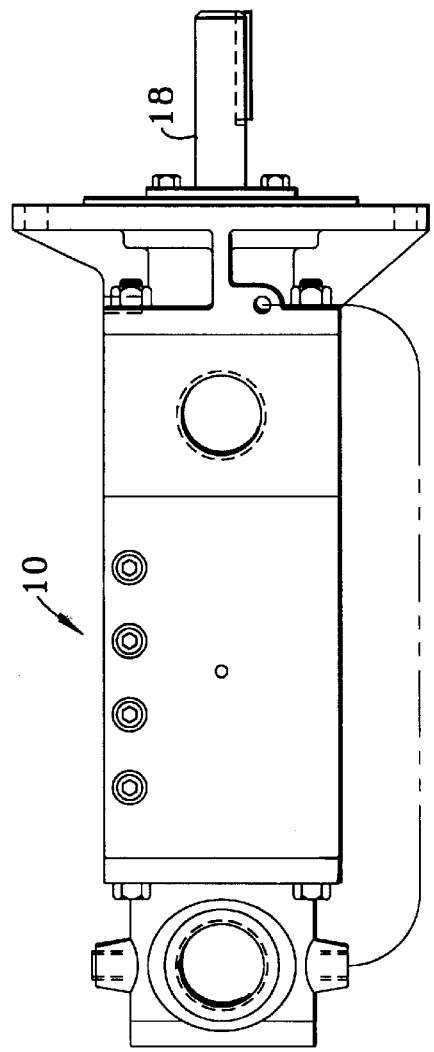
FIG. 36 is a clockwise rotation of the assembly illustrated in FIG. 35.

Processes and materials for hardening pump components, i.e., hardening rotors and coating the balance piston and piston bushing with carbide, have been found to increase resistance to contamination wear. In addition, a carbide thrust bearing arrangement on the idler rotors may again be used to prolong pump life. A power rotor 18 of hardened tool steel, as shown in FIG. 32, and a coated balance piston 12 of a selected low carbon steel, illustrated in FIGS. 33–34, provide further durability, giving consideration to the purpose for which the present invention is intended. Ultimately, the wear resistant material lined rotor housing outlives the other pump components and can be reused in another pump.

More particularly, in one embodiment of the present invention, a wear inhibiting system for a pump rotor housing assembly comprises a two piece, split metal housing lined with an insert of a wear resistant material formed in each of the split, two pieces, the internal surface of each piece being machined to a finished size by wire Electric-discharge machining, after reassembly. The system also includes hardened rotors, carbide coated balance pistons and balance piston housings, and a carbide thrust bearing arrangement on idler rotors of the housing, including a carbide thrust plate and an carbide coated idler thrust bearing or enhanced idler thrust bearing.

In another embodiment is a wear inhibiting system for a pump rotor housing assembly comprises a split, two piece housing including a wear resistant coating sprayed into each piece of the split metal housing. After assembly, the assembled housing having the coating is machined to a finished size by wire Electric-discharge machining. Also featured are hardened rotors, carbide coated balance pistons and balance piston housing, and a carbide thrust bearing arrangement on idler rotors of the housing, including a carbide thrust plate and a carbide coated idler thrust bearing or an enhanced idler thrust bearing.

Further, there is provided a wear inhibiting system for a pump rotor housing assembly comprising, a two piece split housing including a molded insert of a wear resistant material glued into substantially each housing piece; the two piece housing unit being assembled together and the interior surface of the insert being machined to a finished size by wire Electric-discharge machining. Again, hardened rotors, carbide coated balance pistons and balance piston housings, and a carbide thrust arrangement on idler rotors of the housing, including a carbide thrust plate and carbide coated idler thrust bearing or enhanced idler thrust bearing, are provided.

According to still another embodiment, a wear inhibiting system for a pump rotor housing assembly comprises, a housing constructed of a wear resistant liner cast into the housing having a conventional outer diameter. The interior surface of the wear resistant liner is machined to a finished size by wire Electric-discharge machining. Hardened rotors, carbide coated balance pistons and balance piston housings, and a carbide thrust bearing arrangement on the idler rotors, including a carbide thrust plate and a carbide coated idler thrust bearing or an enhanced idler thrust bearing are provided to complete the pump assembly.

Accordingly, pump life is significantly extended in contamination type wear environments where normal hydrodynamic support of the idler rotors is upset, allowing metal-to-metal contact, and consequent wear of the pump rotors.

In the presently preferred method of manufacture of a two piece metal housing having wear resistant interior surfaces and a slightly oversized tri-bore shape is machined into an assembled, but as yet uncoated, two piece, split metal housing. The presently preferred method of machining the tri-bore shape is by wire electrical discharge machining or (EDM). After successful machining of the rough tri-bore shape, the split housing is then disassembled into two halves or two pieces. The inner surfaces of the tri-bore area are coated with a hard coating such as, for example, tungsten carbide sprayed by means such as, for example, high velocity oxy-fuel (HVOF). After the completion of this particular step, then the two halves of the split housing are reassembled. The interior surfaces of the tri-bore area are then finished by EDM to the finished tri-bore dimensions.

This particular preferred method utilizes the advantage of a split housing in that the wear resistant material can be applied to each of the two pieces in the disassembled condition. This preferred method has an important advantage in that in order to create finished rotor housings, no special tooling such as, for example, special wheels for surface grinding the super-hard coating in the tri-bore area to highly precise dimensions is required. Further, additional special tools which were previously required to align the finished halves so that the tri-bore in one half would exactly mirror the tri-bore in the other half up on assembly after the tri-bore area of each piece had been finished separately are no longer required.

The presently preferred method utilizes standard EDM wires and is computer controlled in order to assure a highly accurate tri-bore shape. Having the two halves of the split assembly assembled during the final finishing provides for a continuous tri-bore shape, eliminating the requirement for alignment during reassembly if the two halves of the housing were to be final finished in the unassembled state.

In one presently preferred method, the housing in both the unassembled and assembled condition is wire Electric discharge machined by a wire Electric discharge machine, such as, for example, a ROBOFIL-310 available from Charmilles Technologies Corp., 560 Bond Street, Lincolnshire, Ill. 60069.

It should be apparent from the foregoing that Wire Electric Discharge Machining is an important aspect of the present invention. Wire Electric Discharge Machining is a known industrial process and, as such, it is believed unnecessary to provide a detailed description of the exact process used since such would be known to those skilled in the art. Wire Electric Discharge Machining has been the subject of several issued parents of which U.S. Pat. Nos. 4,324,970 and 4,996,406 are representative, the disclosure of each is herein incorporated by reference.

In summary, the present invention uses highly wear resistant materials, such as, for example, a ceramic material, HVOF or welded hard-coatings, in pump rotor housings to inhibit wear and prolong pump life. In addition, the present invention utilizes novel manufacturing methods to avoid manufacturing difficulties and expense previously associated with wear resistant materials.

Although the present invention is shown and described using a, presently preferred, high velocity oxy-fuel (HVOF) applied hard-coating or a ceramic material such as, for example, tungsten carbide, or the like, it is understood that other wear resistant materials may be utilized, giving consideration to the purpose for which the present invention is intended. In accordance with the present invention, coatings applied by high velocity oxy-fuel (HVOF), part of the "thermal spray" family of coating application methods, result in an extremely dense, well bonded coating. Pump components coated by HVOF are known to withstand the rigors of challenging pumping applications involving contamination wear and low viscosity.

Changes and modifications in these specifically described embodiments and methods can be carried out without departing from the scope of the invention that is intended to be limited only by the scope of the appended claims.

What is claimed is:

1. A method of manufacturing a two piece metal housing having wear resistant interior surfaces, the method comprising the steps of:

machining, by wire electrical discharge machining, a slightly oversized shape into an assembled two piece, split metal housing;

disassembling the two piece, split metal housing;

applying a hard material to the inner surfaces of the machined area of each of the two pieces with a hard material;

after completion of the material applying step, reassembling the two pieces of the split metal housing; and machining the interior surfaces of the surfaces of the area where the hard material was applied to the reassembled metal housing by wire electrical discharge machining to predetermined dimensions.

2. The method of claim 1 wherein the hard material is tungsten carbide sprayed by high velocity oxy-fuel (HVOF).

3. The method of claim 1 wherein the hard material comprises a ceramic material or tungsten carbide.

4. The method of claim 1 wherein the hard material applying step comprises:

adhering an insert made of the hard material to the two piece split-housing.

5. The method of claim 1 wherein the hard material applying step comprises:

coating the two piece split-housing with the wear resistant material.

6. The method of claim 1 wherein the hard material applying step comprises:

casting the wear resistant material into the two piece split-housing.

7. A method for extending the useful life of a two piece housing, the method comprising the steps of:

machining, by wire electrical discharge machining, a slightly oversized shape into an assembled two piece, split metal housing;

disassembling the two piece, split metal housing;

selecting a suitable wear resistant material for the application;

applying the wear resistant material to the inner surfaces of the machined area of each of the two pieces;

after completion of the wear resistant material applying step, reassembling the two pieces of the split metal housing; and machining the interior surfaces of the area having the wear resistant material of the reassembled metal housing by wire electrical discharge machining to predetermined dimensions.

8. The method of claim 7 wherein the hard material for the metal housing comprises a ceramic material or tungsten carbide.

9. The method of claim 7 wherein the hard material for the metal housing is tungsten carbide sprayed by high velocity oxy-fuel (HVOF).

10. The method of claim 7 wherein the wear resistant applying step comprises:

adhering an insert made of the wear resistant material to the two piece split-housing, coating the two piece split-housing with the wear resistant material or casting the wear resistant material into the two piece split-housing.

11. A method of manufacturing a two piece metal housing having wear resistant interior surfaces for use as a screw pump, the method comprising the steps of:

machining, by wire electrical discharge machining, a slightly oversized tri-bore shape into an assembled two piece, split metal housing;

disassembling the two piece, split housing into two pieces;

applying a wear resistant material to the inner surfaces of the machined area of each of the two pieces;

after completion of the wear resistant material applying step, reassembling the two halves of the split housing; and finishing the interior surfaces of the tri-bore area of the two assembled pieces by wire electrical discharge machining to the finished tri-bore dimensions.

12. The method of claim 11 wherein the wear resistant material comprises a ceramic material or tungsten carbide.

13. The method of claim 11 wherein the wear resistant material is tungsten carbide sprayed by high velocity oxy-fuel (HVOF).

* * * * *